(12) United States Patent
Hashimoto et al.

(10) Patent No.: US 11,022,979 B2
(45) Date of Patent: Jun. 1, 2021

(54) AUTONOMOUS DRIVING SYSTEM

(71) Applicant: TOYOTA JIDOSHA KABUSHIKI KAISHA, Toyota (JP)

(72) Inventors: Ryuta Hashimoto, Susono (JP); Yoshinori Watanabe, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 16/218,080

(22) Filed: Dec. 12, 2018

(65) Prior Publication Data
US 2019/0235510 A1   Aug. 1, 2019

(30) Foreign Application Priority Data

Feb. 1, 2018   (JP) .............................. JP2018-016609

(51) Int. Cl.
| | |
|---|---|
| *G05D 1/02* | (2020.01) |
| *G05D 1/00* | (2006.01) |
| *B60W 50/00* | (2006.01) |
| *B60W 50/10* | (2012.01) |
| *B60W 50/08* | (2020.01) |

(52) U.S. Cl.
CPC ....... *G05D 1/0214* (2013.01); *B60W 50/0098* (2013.01); *B60W 50/082* (2013.01); *B60W 50/10* (2013.01); *G05D 1/0055* (2013.01); *G05D 1/0088* (2013.01); *G05D 2201/0213* (2013.01)

(58) Field of Classification Search
USPC .......................................................... 701/27
See application file for complete search history.

(56) References Cited

U.S. PATENT DOCUMENTS

| | | | |
|---|---|---|---|
| 10,525,984 B2* | 1/2020 | Seppelt ................ | B60W 40/08 |
| 10,611,384 B1* | 4/2020 | VandenBerg, III ... | B60W 50/14 |
| 2016/0041553 A1 | 2/2016 | Sato et al. | |
| 2017/0308090 A1 | 10/2017 | Asakura | |
| 2020/0057487 A1* | 2/2020 | Sicconi .................. | G06T 7/174 |
| 2020/0207360 A1* | 7/2020 | Dougherty ............ | B60W 40/09 |

FOREIGN PATENT DOCUMENTS

| | | |
|---|---|---|
| JP | 2008-120271 A | 5/2008 |
| JP | 2016-038768 A | 3/2016 |
| JP | 2017-198504 A | 11/2017 |
| WO | 2017/102614 A1 | 6/2017 |

\* cited by examiner

*Primary Examiner* — Tyler D Paige
(74) *Attorney, Agent, or Firm* — Sughrue Mion, PLLC

(57) ABSTRACT

An autonomous driving system controls autonomous driving of a vehicle and calculates an interest level of a driver of the vehicle for the autonomous driving. In a driver-oriented mode, the autonomous driving system gives priority to at least one of setting by the driver, will of the driver, and ride quality. In a performance-oriented mode, the autonomous driving system gives priority to at least one of increase in a safety margin, reduction in a time to arrive at a destination, improvement in fuel economy, improvement in motion performance, and reduction in a frequency of notification to the driver. The autonomous driving system controls the autonomous driving in the driver-oriented mode in a case of a normal state, and controls the autonomous driving in the performance-oriented mode in a case of a low interest state where the interest level is lower than the normal state.

10 Claims, 15 Drawing Sheets

| (A) INCREASE IN SAFETY MARGIN | LANE SELECTION | (A1) KEEP LEFT DRIVING |
| --- | --- | --- |
| | | (A2) SELECT LANE NOT ADJACENT TO WALL |
| | | (A3) SELECT LANE WITH LESS ADJACENT VEHICLE |
| | | (A4) AVOID MERGED SECTION |
| | TRAVEL CONTROL | (A5) ENLARGE MARGIN DISTANCE TO PRECEDING VEHICLE |
| | | (A6) ENLARGE MARGIN DISTANCE TO ADJACENT VEHICLE |
| | | (A7) ADVANCE DECELERATION TIMING |
| | LANE CHANGE | (A8) TIGHTEN LANE CHANGEABLE CONDITION |
| | | (A9) INCREASE INTER-VEHICLE DISTANCE AT START OF OVERTAKING |
| (B) REDUCTION IN TIME TO DESTINATION | LANE CHANGE | (B1) ACTIVELY PERFORM OVERTAKING |
| | LANE SELECTION | (B2) STAY IN FAST LANE |
| (C) IMPROVEMENT IN FUEL ECONOMY | TRAVEL CONTROL | (C1) ECO-DRIVE MODE |
| (D) IMPROVEMENT IN MOTION PERFORMANCE | TRAVEL CONTROL | (D1) INCREASE UPPER LIMITS OF ACCELERATION, DECELERATION, AND LATERAL G |
| | | (D2) IMPROVE FOLLOWING PERFORMANCE |
| | | (D3) SHORTEN TIME TO WAIT FOR DRIVER TO COMPLETE SITUATION CHECK |
| (E) REDUCTION IN NOTIFICATION FREQUENCY | | (E1) REFRAIN FROM ASKING DRIVER'S WILL |
| | | (E2) REDUCE NUMBER OF TIMES OF LANE CHANGE |

*Fig. 6*

AUTONOMOUS DRIVING SYSTEM

BACKGROUND

Technical Field

The present disclosure relates to an autonomous driving system that controls autonomous driving of a vehicle.

Background Art

Patent Literature 1 discloses a vehicle control device that is capable of switching between autonomous driving and manual driving of a vehicle. When switching from the autonomous driving to the manual driving, the vehicle control device notifies a driver that the autonomous driving will end. Here, the vehicle control device calculates a degree of manual driving adaptation of the driver based on a driver state, and makes the notification timing earlier as the degree of manual driving adaptation is lower.

LIST OF RELATED ART

Patent Literature 1: Japanese Unexamined Patent Application Publication No. JP-2016-38768

SUMMARY

In general, autonomous driving control of a vehicle is performed with fully considering driver's preference and ride quality. When such the autonomous driving control is performed, potential performance of the vehicle is not necessarily fully exercised.

An object of the present disclosure is to provide an autonomous driving control technique that can achieve a balance between consideration for a driver and exercise of potential performance of a vehicle.

A first disclosure is directed to an autonomous driving system mounted on a vehicle.

The autonomous driving system includes:

an autonomous driving control device configured to control autonomous driving of the vehicle; and an interest level calculation device configured to calculate an interest level of a driver of the vehicle for the autonomous driving.

A low interest state is a state where the interest level is lower than a normal state.

Modes of the autonomous driving include:

a driver-oriented mode in which the autonomous driving control device gives priority to at least one of setting by the driver, will of the driver, and ride quality; and a performance-oriented mode in which the autonomous driving control device gives priority to at least one of increase in a safety margin, reduction in a time to arrive at a destination, improvement in fuel economy, improvement in motion performance, and reduction in a frequency of notification to the driver.

The autonomous driving control device controls the autonomous driving in the driver-oriented mode in a case of the normal state, and controls the autonomous driving in the performance-oriented mode in a case of the low interest state.

A second disclosure further has the following feature in addition to the first disclosure.

When increasing the safety margin in the performance-oriented mode, the autonomous driving control device performs keep left driving regardless of the setting by the driver or the will of the driver.

A third disclosure further has the following feature in addition to the first disclosure.

A merge lane merges with a merged section of a first lane ahead of the vehicle.

When increasing the safety margin in the performance-oriented mode, the autonomous driving control device makes the vehicle travel so as to avoid the merged section regardless of the setting by the driver or the will of the driver.

A fourth disclosure further has the following feature in addition to the first disclosure.

The autonomous driving control device performs the autonomous driving with a margin distance to a surrounding vehicle.

When increasing the safety margin in the performance-oriented mode, the autonomous driving control device increases the margin distance as compared with a case of the driver-oriented mode.

A fifth disclosure further has the following feature in addition to the first disclosure.

When a lane changeable condition is satisfied, the autonomous driving control device judges that a lane change is possible.

When increasing the safety margin in the performance-oriented mode, the autonomous driving control device makes the lane changeable condition be harder to satisfy as compared with a case of the driver-oriented mode.

A sixth disclosure further has the following feature in addition to the first disclosure.

When an overtaking execution condition is satisfied, the autonomous driving control device starts overtaking processing for overtaking a preceding vehicle.

The overtaking execution condition includes that an inter-vehicle distance between the vehicle and the preceding vehicle is less than a first threshold.

When increasing the safety margin in the performance-oriented mode, the autonomous driving control device increases the first threshold as compared with a case of the driver-oriented mode.

A seventh disclosure further has the following feature in addition to the first disclosure.

When an overtaking execution condition is satisfied, the autonomous driving control device starts overtaking processing for overtaking a preceding vehicle.

The overtaking execution condition includes that a relative speed between the vehicle and the preceding vehicle is equal to or more than a second threshold.

When reducing the time to arrive at the destination in the performance-oriented mode, the autonomous driving control device decreases the second threshold as compared with a case of the driver-oriented mode.

An eighth disclosure further has the following feature in addition to the first disclosure.

When improving the motion performance in the performance-oriented mode, the autonomous driving control device increases upper limits of acceleration and deceleration of the vehicle as compared with a case of the driver-oriented mode.

A ninth disclosure further has the following feature in addition to the first disclosure.

When improving the motion performance in the performance-oriented mode, the autonomous driving control device advances a start timing of a lane change as compared with a case of the driver-oriented mode.

A tenth disclosure further has the following feature in addition to the first disclosure.

When reducing the frequency of notification in the performance-oriented mode, the autonomous driving control device performs the autonomous driving without asking the will of the driver.

The autonomous driving system according to the present disclosure controls the autonomous driving in the driver-oriented mode in the case of the normal state, and controls the autonomous driving in the performance-oriented mode in the case of the low interest state. It is thus possible to exercise the potential performance of the vehicle without giving the driver a feeling of strangeness. In other words, it is possible to achieve a balance between consideration for the driver and exercise of the potential performance of the vehicle.

BRIEF DESCRIPTION OF DRAWINGS

FIG. 6 is conceptual diagram showing concrete examples of autonomous driving control in a performance-oriented mode by the autonomous driving system according to the embodiment of the present disclosure;

EMBODIMENTS

Embodiments of the present disclosure will be described below with reference to the attached drawings.

1. Outline

Figure 1:
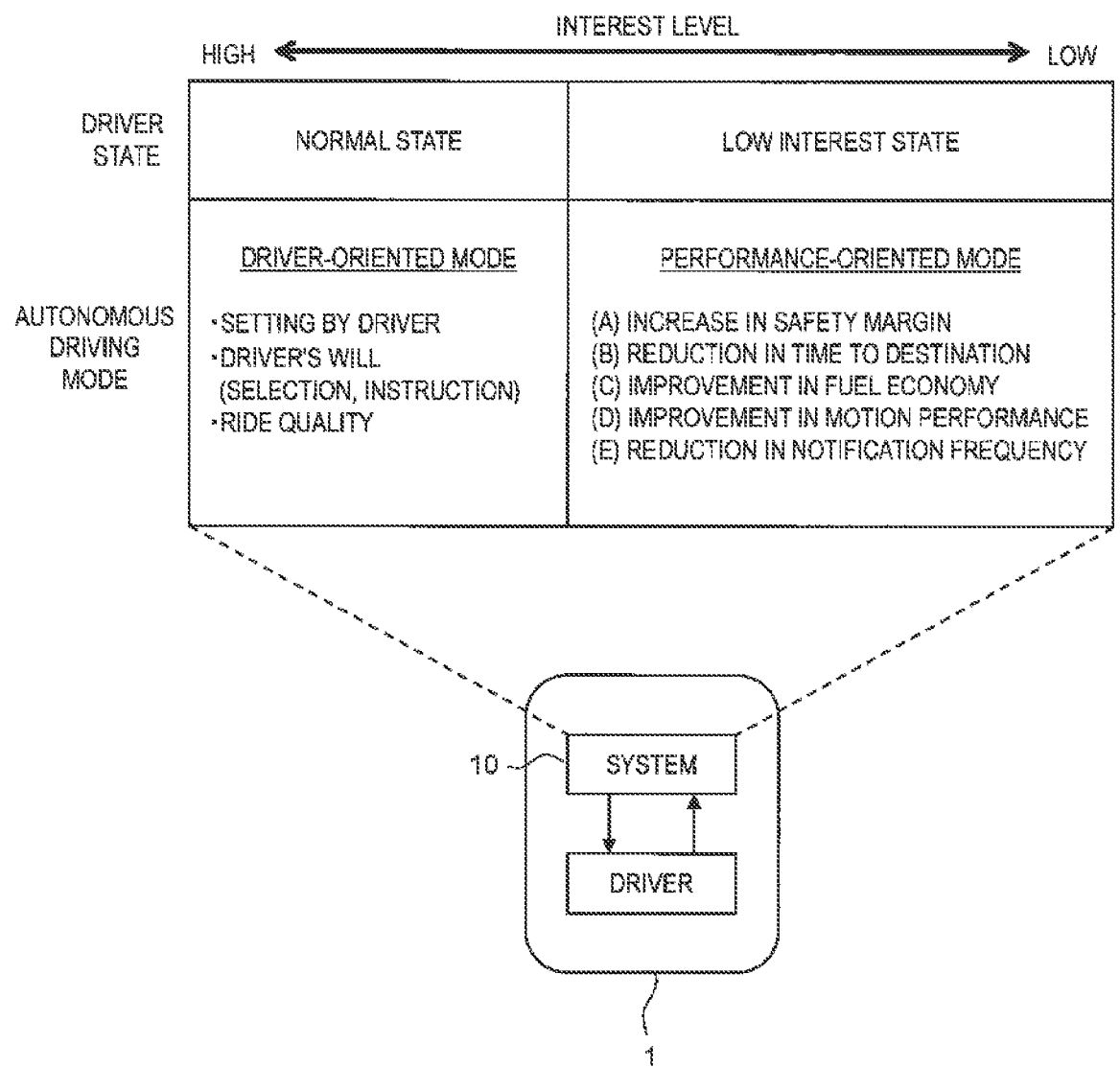
FIG. 1 is a conceptual diagram for explaining an autonomous driving system according to an embodiment of the present disclosure.

FIG. 1 is a conceptual diagram for explaining an autonomous driving system 10 according to the present embodiment. The autonomous driving system 10 is mounted on a vehicle 1 and controls autonomous driving of the vehicle 1. For example, the autonomous driving system 10 controls travel of the vehicle 1 during the autonomous driving. The autonomous driving system 10 is provided with at least two autonomous driving modes.

A first autonomous driving mode is a "driver-oriented mode". In the driver-oriented mode, the autonomous driving system 10 performs the autonomous driving control with giving priority to consideration for a driver of the vehicle 1. More specifically, the autonomous driving system 10 performs the autonomous driving control with giving priority to at least one of setting by the driver, will (selection, instruction) of the driver, and ride quality. An example of the setting by the driver is an inter-vehicle distance to a preceding vehicle that is set to a desired value by the driver. An example of the will of the driver is approval/refusal of a lane change proposed by the autonomous driving system 10.

A second autonomous driving mode is a "performance-oriented mode". In the performance-oriented mode, the autonomous driving system 10 performs the autonomous driving control with giving priority to exercise of potential performance of the vehicle 1. More specifically, the autonomous driving system 10 performs the autonomous driving control with giving priority to at least one of the following standpoints (A) to (E).

(A) Increase in safety margin
(B) Reduction in time to arrive at destination
(C) Improvement in fuel economy
(D) Improvement in motion performance
(E) Reduction in frequency of notification to driver The autonomous driving system 10 according to the present embodiment switches the autonomous driving mode according to a state of the driver. More specifically, the autonomous driving system 10 switches between the driver-oriented mode and the performance-oriented mode according to an "interest level IL" of the driver. The interest level IL is a degree of the driver's interest in the autonomous driving of the vehicle 1.

A state where the interest level IL is comparatively high is hereinafter referred to as a "normal state". In a case of the normal state, the autonomous driving system 10 gives priority to consideration for the driver and performs the autonomous driving control in the driver-oriented mode. On the other hand, for example, when the driver views contents in the vehicle 1, the interest level IL for the autonomous driving is low. In such a state where the interest level IL is low, the driver scarcely has a feeling of strangeness about the autonomous driving control even when consideration for the driver is not given priority. Therefore, in a case of a "low interest state" where the interest level IL is comparatively low, the autonomous driving system 10 performs the autonomous driving control in the performance-oriented mode in order to exercise the potential performance of the vehicle 1.

As described above, the autonomous driving system 10 according to the present embodiment controls the autonomous driving in the driver-oriented mode in the case of the normal state, and controls the autonomous driving in the performance-oriented mode in the case of the low interest state. It is thus possible to exercise the potential performance of the vehicle 1 without giving the driver a feeling of strangeness. In other words, it is possible to achieve a balance between consideration for the driver and exercise of the potential performance of the vehicle 1.

2. Autonomous Driving System 2-1. Overall Configuration Example

Figure 2:
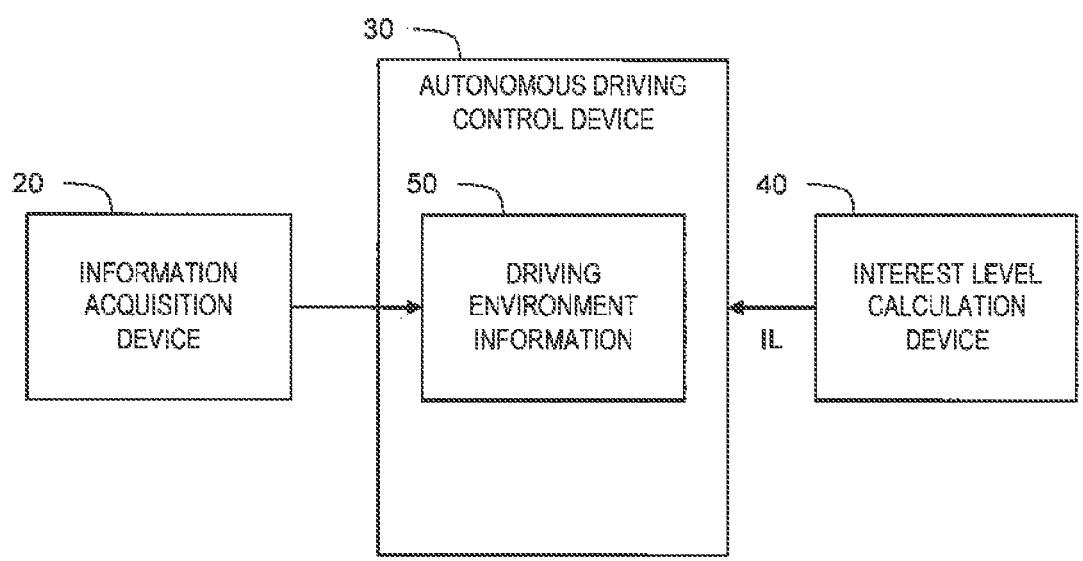
FIG. 2 is a block diagram schematically showing a configuration of the autonomous driving system according to the embodiment of the present disclosure.

FIG. 2 is a block diagram schematically showing a configuration of the autonomous driving system 10 according to the present embodiment. The autonomous driving system 10 includes an information acquisition device 20, an autonomous driving control device 30, and an interest level calculation device 40.

The information acquisition device 20 acquires driving environment information 50 indicating driving environment for the vehicle 1. The autonomous driving control device 30 controls the autonomous driving of the vehicle 1 based on the driving environment information 50. The interest level calculation device 40 calculates the interest level IL of the driver for the autonomous driving. The autonomous driving control device 30 controls the autonomous driving of the vehicle 1 according to the interest level IL.

Figure 3:
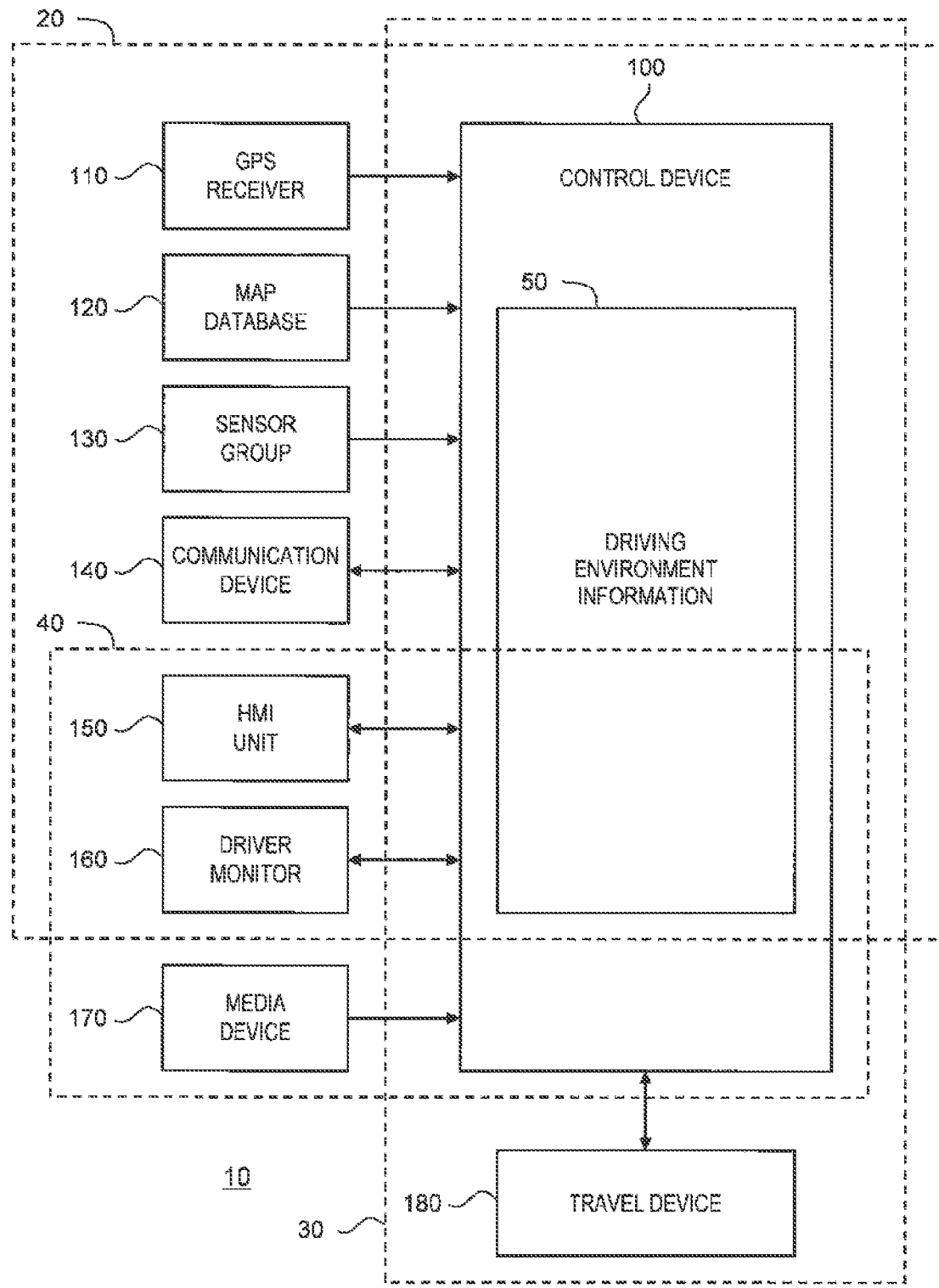
FIG. 3 is a block diagram showing a concrete configuration example of the autonomous driving system according to the embodiment of the present disclosure.

FIG. 3 is a block diagram showing a concrete configuration example of the autonomous driving system 10. The autonomous driving system 10 is provided with a control device 100, a GPS (Global Positioning System) receiver 110, a map database 120, a sensor group 130, a communication device 140, an HMI (Human Machine Interface) unit 150, a driver monitor 160, and a travel device 180.

The control device 100 controls the autonomous driving of the vehicle 1. The control device 100 is a microcomputer including a processor and a memory device. The control device 100 is also called an ECU (Electronic Control Unit). The autonomous driving control by the control device 100 is achieved by the processor executing a control program stored in the memory device.

The GPS receiver 110 receives signals transmitted from a plurality of GPS satellites and calculates a position and an orientation of the vehicle 1 based on the received signals.

Map information is recorded in the map database 120. The map information includes information of lane geometries, lane attributes (e.g. slower traffic lane, speed limit), autonomous driving permitted zones, and the like.

The sensor group 130 detects a situation around the vehicle 1 and a state of the vehicle 1. The sensor group 130 is exemplified by a LIDAR (Laser Imaging Detection and Ranging), a radar, and a camera. In addition, the sensor group 130 includes a vehicle state sensor that detects a state of the vehicle 1. The vehicle state sensor includes a vehicle speed sensor that detects a speed of the vehicle 1.

The communication device 140 communicates with the outside of the vehicle 1. For example, the communication device 140 performs a V2I communication (a vehicle-to-infrastructure communication) and a V2V communication (a vehicle-to-vehicle communication). In addition, the communication device 140 may communicate with a management server managing autonomous driving service through a communication network.

The HMI unit 150 is an interface for proving the driver with information and receiving information from the driver. More specifically, the HMI unit 150 includes an input device and an output device. The input device is exemplified by a touch panel, a switch, a microphone, and the like. The output device is exemplified by a display device, a speaker, and the like. The output device is used for a variety of notifications (e.g. lane change proposal) from the autonomous driving system 10 to the driver. The input device is used by the driver for communicating preferred settings (e.g. inter-vehicle distance, vehicle speed) and the driver's will (e.g. approval or refusal of lane change proposal) to the autonomous driving system 10.

The driver monitor 160 detects a state of the driver through imaging. More specifically, the driver monitor 160 includes an imaging device such as an infrared camera. The driver monitor 160 is capable of detecting various kinds of the state of the driver by analyzing an image obtained by the imaging device. For example, the driver monitor 160 can detect an orientation of a face, a direction of eyes, and an eye opening/closing degree of the driver.

The media device 170 is a device for the driver to view contents. The media device 170 includes a monitor that displays videos and images, and a speaker that outputs sounds. The media device 170 may be included in the HMI unit 150.

The travel device 180 includes a steering device, a driving device, a braking device, and a turn signal. The steering device turns wheels. The driving device is a power source that generates a driving force. The driving device is exemplified by an engine and an electric motor. The braking device generates a braking force.

2-2. Information Acquisition Device

The control device 100 acquires the driving environment information 50 by using the GPS receiver 110, the map database 120, the sensor group 130, the communication device 140, the HMI unit 150, and the driver monitor 160.

Figure 4:
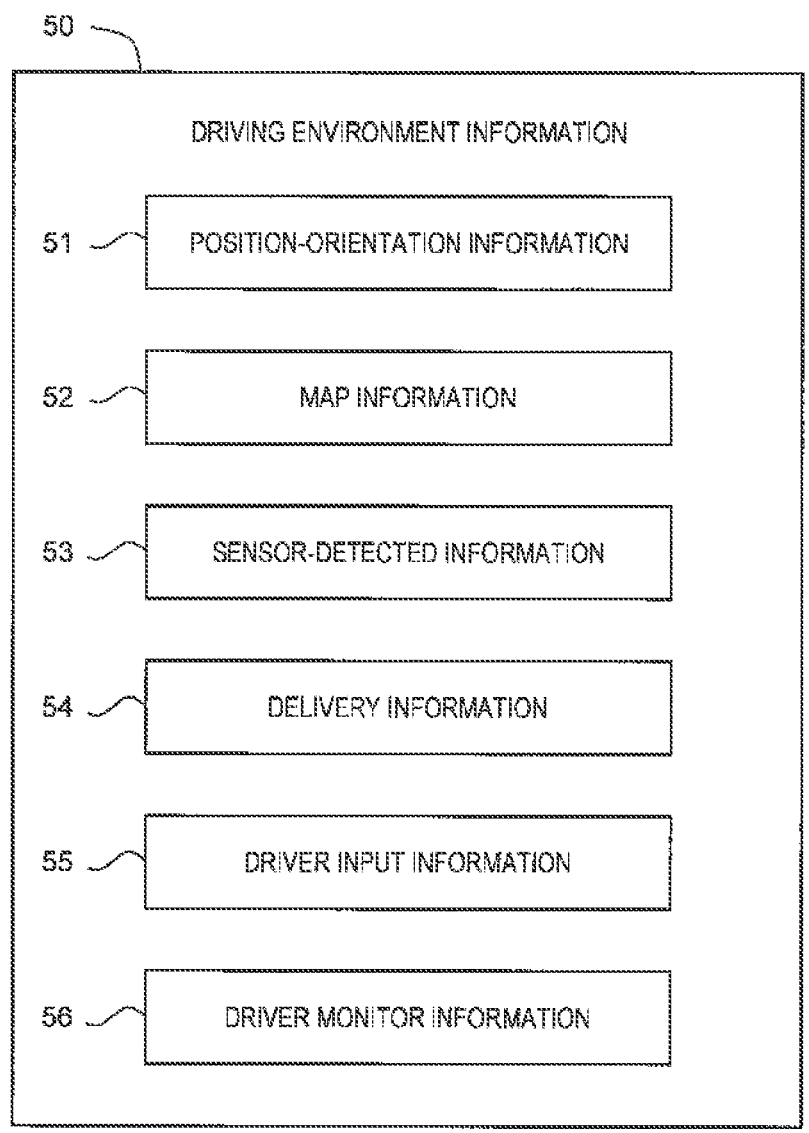
FIG. 4 is a block diagram showing an example of driving environment information used in the autonomous driving system according to the embodiment of the present disclosure.

FIG. 4 shows an example of the driving environment information 50 in the present embodiment. The driving environment information 50 includes position-orientation information 51, map information 52, sensor-detected information 53, delivery information 54, driver input information 55, and driver monitor information 56.

The position-orientation information 51 indicates the position and the orientation of the vehicle 1. The control device 100 acquires the position-orientation information 51 from the GPS receiver 110.

The map information 52 includes information of lane geometries, lane attributes (e.g. slower traffic lane, speed limit), autonomous driving permitted zones, and the like. The control device 100 acquires the map information 52 around the vehicle 1 based on the position-orientation information 51 and the map database 120.

The sensor-detected information 53 is information acquired based on a result of detection by the sensor group 130. More specifically, the sensor-detected information 53 includes target information regarding a target around the vehicle 1. The target around the vehicle 1 is exemplified by a surrounding vehicle, a fallen object, a white line, a roadside structure, a sign, and so forth. The target information includes a relative position, a relative speed, and the like of the detected target as seen from the vehicle 1. In addition, the sensor-detected information 53 includes the state of the vehicle 1 detected by the vehicle state sensor. The control device 100 acquires the sensor-detected information 53 based on the result of detection by the sensor group 130.

The delivery information 54 is information acquired through the communication device 140. For example, the delivery information 54 includes road traffic information (traffic jam information, road work zone information, accident information, traffic regulation information, and the like) delivered from an infrastructure. The delivery information 54 may include information delivered from the management server managing the autonomous driving service. The control device 100 acquires the delivery information 54 by using the communication device 140 to communicate with the outside of the vehicle 1.

The driver input information 55 is information input by the driver through the HMI unit 150. The driver input information 55 indicates the setting by the driver and the will of the driver.

The driver monitor information 56 is information acquired by the driver monitor 160. For example, the driver monitor information 56 indicates the orientation of the face, the direction of eyes, and the eye opening/closing degree of the driver.

It can be said that the control device 100, the GPS receiver 110, the map database 120, the sensor group 130, the communication device 140, the HMI unit 150, and the driver monitor 160 constitute the "information acquisition device 20" shown in FIG. 2.

2-3. Autonomous Driving Control Device

The control device 100 controls the autonomous driving of the vehicle 1 based on the driving environment information 50. In particular, the control device 100 performs vehicle travel control that controls travel of the vehicle 1 based on the driving environment information 50. More specifically, the control device 100 creates a travel plan based on the driving environment information 50. Then, the control device 100 controls the travel device 180 to make the vehicle 1 travel in accordance with the travel plan. It can be said that the control device 100 and the travel device 180 constitute the "autonomous driving control device 30" shown in FIG. 2.

2-4. Interest Level Calculation Device

Furthermore, the control device 100 calculates the interest level IL of the driver. For example, the control device 100 can calculate the interest level IL based on the driver monitor information 56. For example, the interest level IL is calculated to be lower as an angle between the orientation of the face of the driver and a front direction becomes larger. A speech state is detected based on movement of the driver's mouth, and the interest level IL is calculated to be low when the driver speaks.

As another example, the control device 100 can calculate the interest level IL based on the driver input information 55. For example, the speech state is detected based on a microphone input of the HMI unit 150, and the interest level IL is calculated to be low when the driver speaks. Alternatively, the driver may use the input device of the HMI unit 150 to communicate the interest level IL to the autonomous driving system 10.

As still another example, when the driver activates the media device 170 to view contents, the interest level IL is considered to be low. Therefore, the control device 100 can calculate the interest level IL based on whether or not the media device 170 is playing contents. When the media device 170 is playing contents, the interest level IL is calculated to be low.

As still another example, when the driver reclines the driver's seat, the interest level IL is determined to be low.

It can be said that the control device 100, the HMI unit 150, the driver monitor 160, and the media device 170 constitute the "interest level calculation device 40" shown in FIG. 2.

2-5. Process Flow

Figure 5:
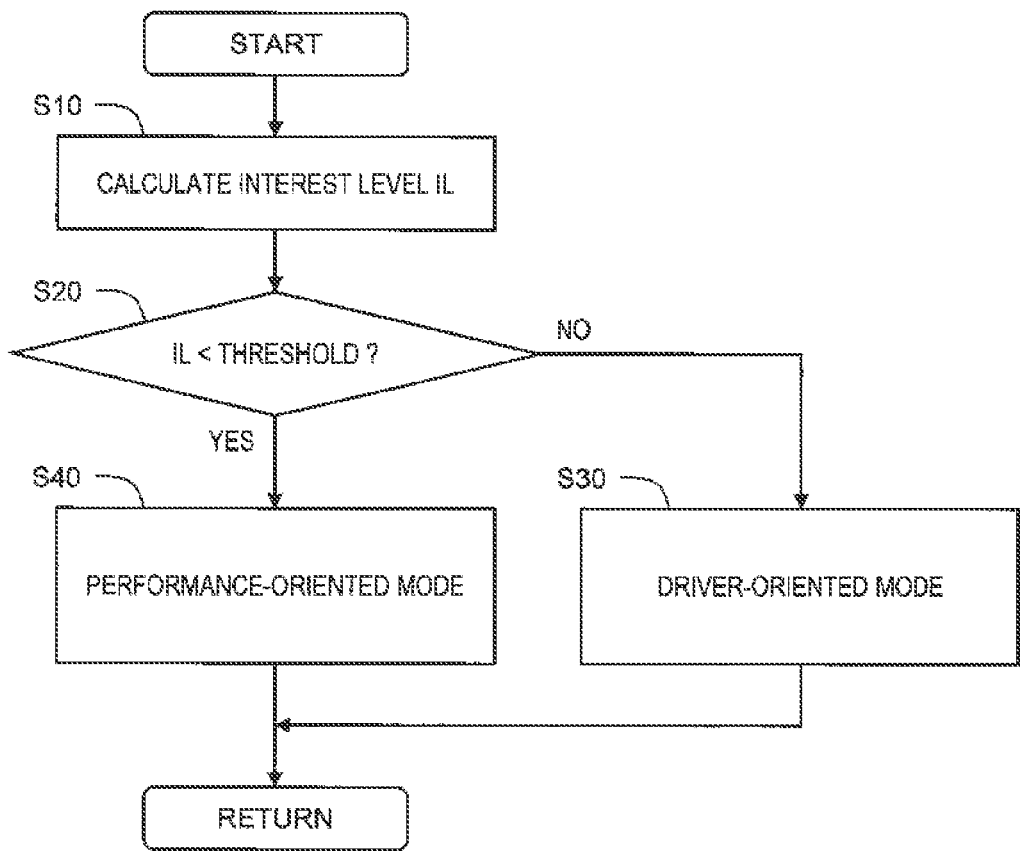
FIG. 5 is a flow chart showing processing by a control device of the autonomous driving system according to the embodiment of the present disclosure.

FIG. 5 is a flow chart showing processing by the control device 100 of the autonomous driving system 10 according to the present embodiment. The flow shown in FIG. 5 is repeatedly executed every certain cycle.

In Step S10, the control device 100 (the interest level calculation device 40) calculates the interest level IL of the driver. In the subsequent Step S20, the control device 100 compares the interest level IL with a threshold. When the interest level IL is equal to or higher than the threshold (Step S20; No=normal state), the processing proceeds to Step S30. On the other hand, when the interest level IL is lower than the threshold (Step S20; Yes=low interest state), the processing proceeds to Step S40.

In Step S30, the control device 100 (the autonomous driving control device 30) performs the autonomous driving control in the driver-oriented mode. In the driver-oriented mode, the control device 100 performs the autonomous driving control with giving priority to at least one of the setting by the driver, the will (selection, instruction) of the driver, and the ride quality. For example, the driver can use the input device of the HMI unit 150 to communicate preferred settings (e.g. inter-vehicle distance, vehicle speed) and the driver's will (e.g. approval or refusal of lane change proposal) to the autonomous driving system 10. The control device 100 recognizes the driver's settings and will based on the driver input information 55 and gives priority to them. When giving priority to the ride quality, the control device 100 performs the vehicle travel control with suppressing acceleration/deceleration.

In Step S40, the control device 100 (the autonomous driving control device 30) performs the autonomous driving control in the performance-oriented mode. In the performance-oriented mode, the control device 100 performs the autonomous driving control with giving priority to at least one of the standpoints (A) to (E) shown in FIG. 1. FIG. 6 shows a variety of concrete examples of the autonomous driving control in the performance-oriented mode. Hereinafter, concrete examples for each of the standpoints (A) to (E) will be described.

3. Increase in Safety Margin

The standpoint (A) is increase in a safety margin. The autonomous driving control device 30 performs the autonomous driving control with giving priority to increase in the safety margin, regardless of the setting by the driver or the will of the driver.

3-1. Lane Selection

A method of increasing the safety margin includes selecting a safe lane as a travel lane regardless of the setting by the driver or the will of the driver. In order to explain lane selection, let us first explain an example of lane planning.

Figure 7:
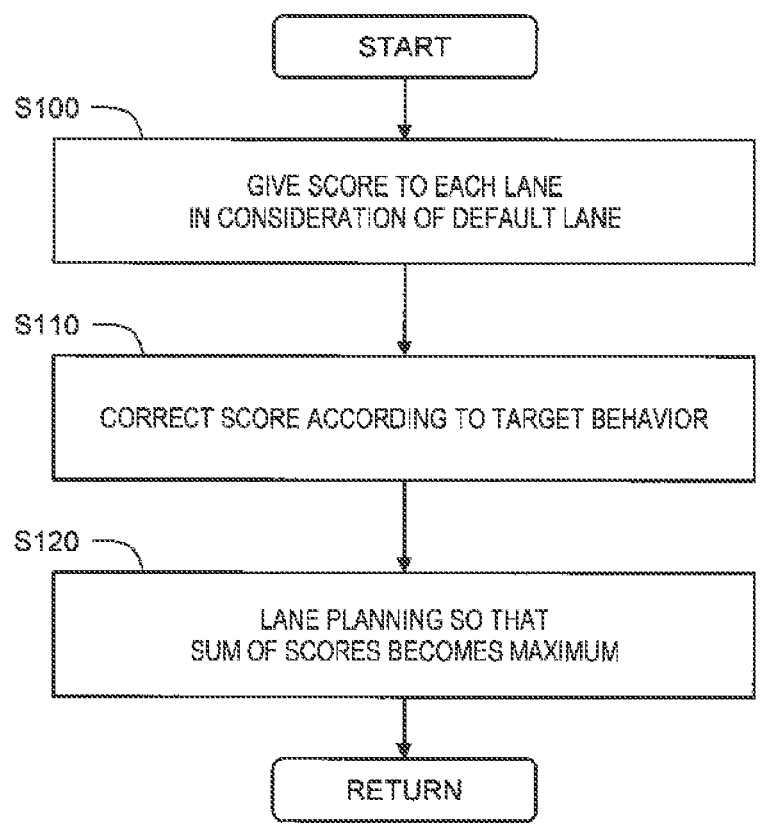
FIG. 7 is a flow chart showing an example of lane planning by the autonomous driving system according to the embodiment of the present disclosure.

FIG. 7 is a flow chart showing an example of lane planning. In the present example, each lane is given a "score". The score is used as a criterion for determining a travel lane in which the vehicle 1 actually travels. A lane having a higher score has more advantages.

Figure 8:
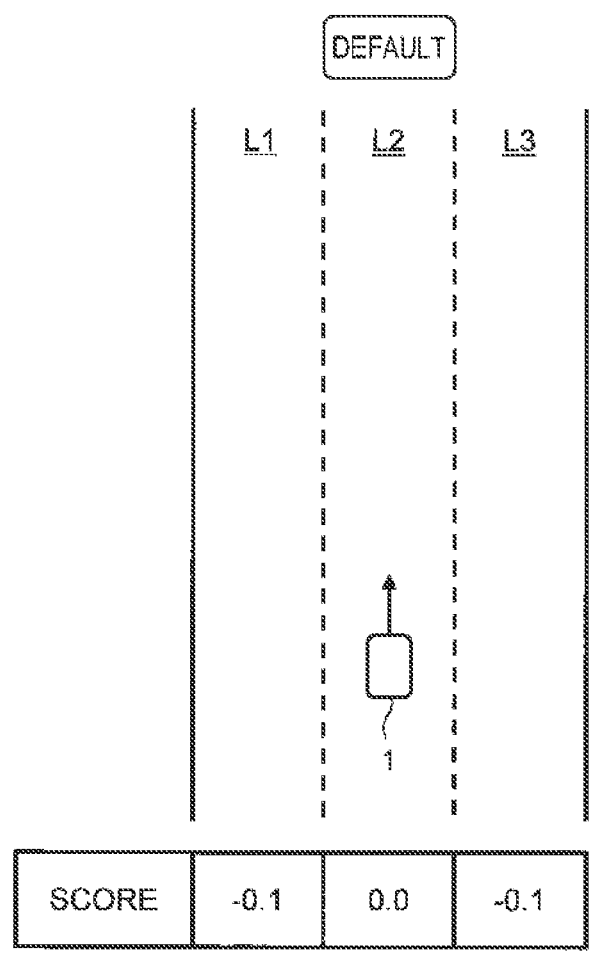
FIG. 8 is a conceptual diagram for explaining an example of lane planning by the autonomous driving system according to the embodiment of the present disclosure.

First, in Step S100, the autonomous driving control device 30 gives a score to each lane in consideration of a default lane (see FIG. 8). The default lane is a lane in which the vehicle 1 basically travels. Typically, the default lane is a current lane in which the vehicle 1 is currently traveling. In an example shown in FIG. 8, a lane L2 is the default lane. The scores are first given such that the score of the default lane is the highest and the score becomes lower as away from the default lane.

In the subsequent Step S110, the autonomous driving control device 30 performs score correction according to a target behavior. Then, the autonomous driving control device 30 performs the lane planning so that a sum of scores up to arrive at the destination becomes maximum (Step S120). Typically, a lane having the highest score is selected as the travel lane in which the vehicle 1 travels. Then, the autonomous driving control device 30 performs the vehicle travel control such that the vehicle 1 travels in accordance with a result of the lane planning.

An example of the target behavior is a lane change. A situation requiring the lane change is exemplified by lane merging, lane branching, overtaking a low-speed preceding vehicle, and so forth. The lane merging and the lane branching are recognized based on the map information 52. The low-speed preceding vehicle is recognized by the sensor-detected information 53 (specifically, the target information). When the lane change is required, the autonomous driving control device 30 performs the score correction such that the score of a target lane of the lane change becomes higher. As a result, the lane change becomes likely to be performed.

(A1) Keep Left Driving

Figure 9:
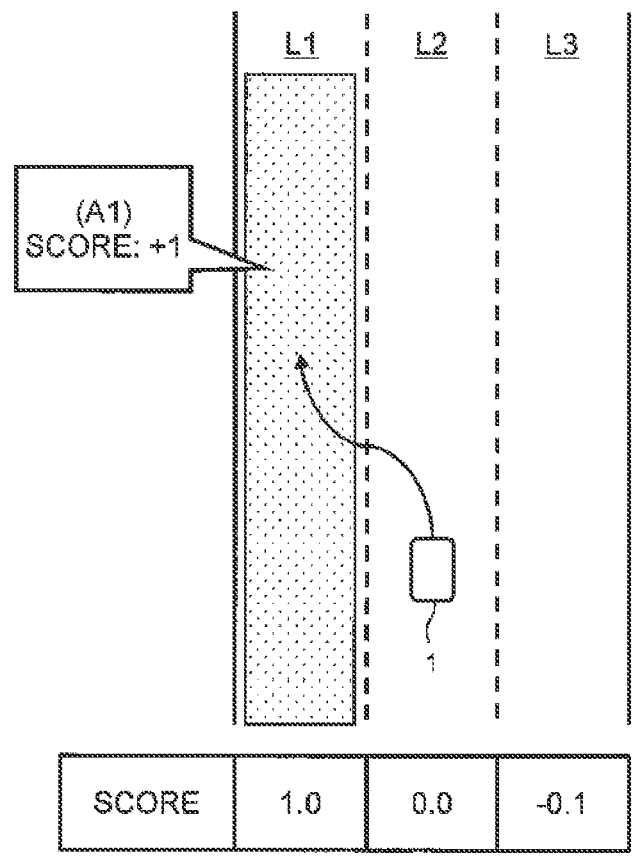
FIG. 9 is a conceptual diagram for explaining another example of lane planning by the autonomous driving system according to the embodiment of the present disclosure.

An example of the increase in the safety margin is to perform keep left driving. Information on the lane geometries is included in the map information 52. As shown in FIG. 9, the autonomous driving control device 30 increases the score of a leftmost lane L1. Since the score of the lane L1 becomes the highest, the keep left driving is performed.

(A2) Select Lane not Adjacent to Wall

Another example of the increase in the safety margin is to select a lane that is not adjacent to a wall. Information on the lane geometries is included in the map information 52. The autonomous driving control device 30 increases the score of the lane L2 that is not adjacent to any wall.

(A3) Select Lane with Less Adjacent Vehicle

Figure 10:
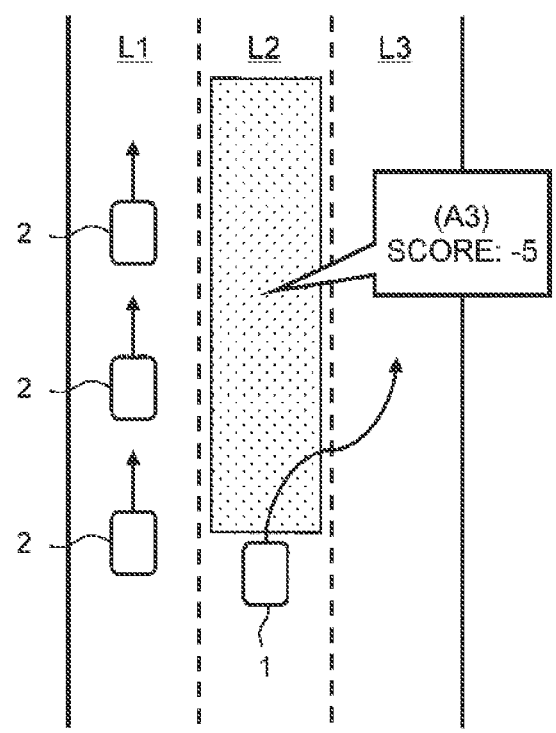
FIG. 10 is a conceptual diagram for explaining a still another example of lane planning by the autonomous driving system according to the embodiment of the present disclosure.

A still another example of the increase in the safety margin is to select a lane with less adjacent vehicle. In an example shown in FIG. 10, the vehicle 1 is traveling in a lane L2 and there are a lot of adjacent vehicles 2 in a lane L1 adjacent to the lane L2. The adjacent vehicle 2 can be recognized based on the sensor-detected information 53 (specifically, the target information). The autonomous driving control device 30 decreases the score of the lane L2 to urge a lane change to a lane L3 with less adjacent vehicles 2.

(A4) Avoid Merged Section

Figure 11:
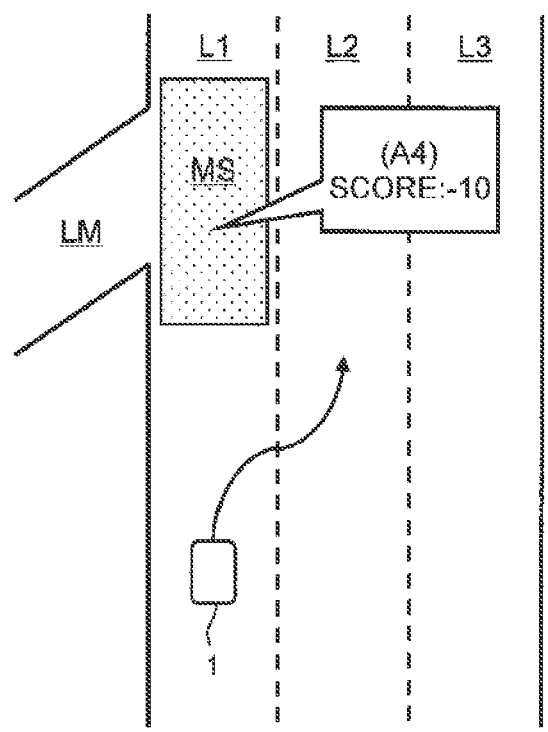
FIG. 11 is a conceptual diagram for explaining a still another example of lane planning by the autonomous driving system according to the embodiment of the present disclosure.

A still another example of the increase in the safety margin is to make the vehicle 1 travel so as to avoid a merged section. In an example shown in FIG. 11, there is a merged section MS in a lane L1 ahead of the vehicle 1. That is, a merge lane LM merges with the merged section MS of the lane L1. The merged section MS can be recognized based on the map information 52. The autonomous driving control device 30 decreases the score of the merged section MS to urge to avoid the merged section MS.

3-2. Travel Control

Figure 12:
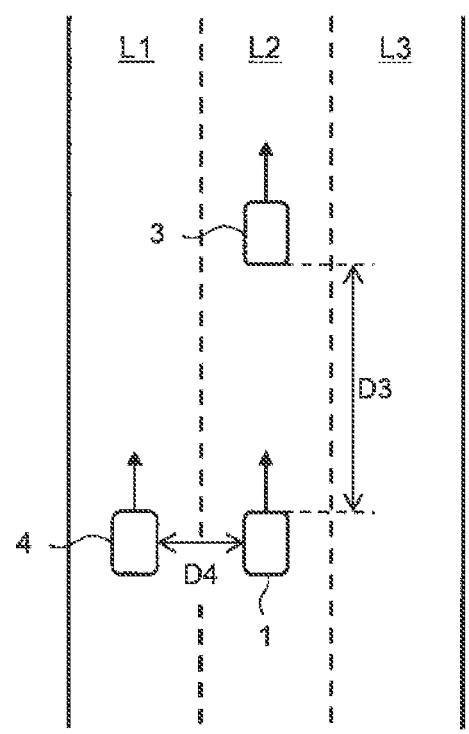
FIG. 12 is a conceptual diagram for explaining a margin distance to a surrounding vehicle in the embodiment of the present disclosure.

The autonomous driving control device 30 performs the autonomous driving control with a margin distance to a surrounding vehicle. In FIG. 12, a margin distance between the vehicle 1 and a preceding vehicle 3 is denoted by "D3", and a margin distance (lateral margin) between the vehicle 1 and an adjacent vehicle 4 is denoted by "D4". When an inter-vehicle distance between the vehicle 1 and the preceding vehicle 3 becomes less than the margin distance D3, the autonomous driving control device 30 performs deceleration control to increase the inter-vehicle distance. When a lateral distance between the vehicle 1 and the adjacent vehicle 4 becomes less than the margin distance D4, the autonomous driving control device 30 performs steering control to increase the lateral distance.

(A5) Enlarge Margin Distance to Preceding Vehicle

As still another example of the increase in the safety margin is to enlarge the margin distance D3 to the preceding vehicle 3. That is to say, the autonomous driving control device 30 ignores the setting by the driver and increases the margin distance D3 in the case of the performance-oriented mode as compared with the case of the driver-oriented mode.

(A6) Enlarge Margin Distance to Adjacent Vehicle

As still another example of the increase in the safety margin is to enlarge the margin distance D4 to the adjacent vehicle 4. That is to say, the autonomous driving control device 30 ignores the setting by the driver and increases the margin distance D4 in the case of the performance-oriented mode as compared with the case of the driver-oriented mode.

(A7) Advance Deceleration Timing

As still another example of the increase in the safety margin is to advance a deceleration timing to start deceleration of the vehicle 1. For example, the autonomous driving control device 30 performs deceleration of the vehicle 1 in front of a curve. The deceleration timing to start deceleration is determined based on a current vehicle speed, a target speed after deceleration, and a target deceleration. For example, it is possible to advance the deceleration timing by setting the target deceleration to be lower. By advancing the deceleration timing in the case of the performance-oriented mode as compared with the case of the driver-oriented mode, the safety margin is increased.

3-3. Lane Change (A8) Tighten Lane Changeable Condition

Figure 13:
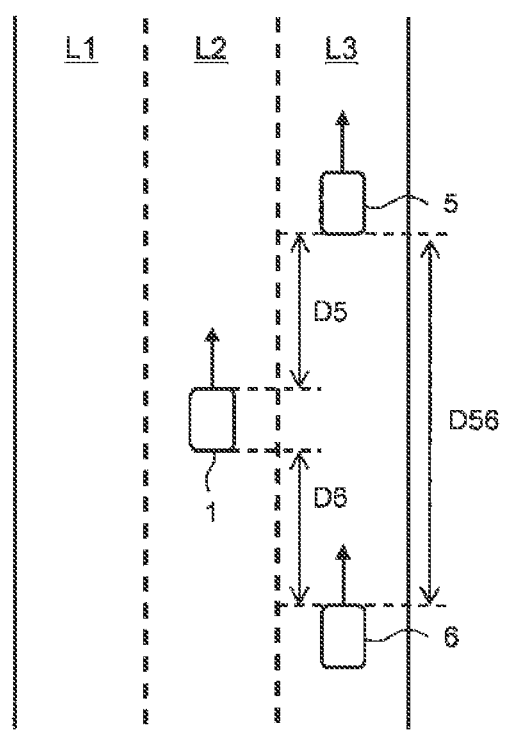
FIG. 13 is a conceptual diagram for explaining a lane changeable condition in the embodiment of the present disclosure.

FIG. 13 is a conceptual diagram for explaining a lane changeable condition. The vehicle 1 is traveling in a lane L2. A target lane of a lane change is a lane L3 adjacent to the lane L2. A preceding vehicle 5 is one closest to the vehicle 1 among preceding vehicles traveling in the lane L3. A following vehicle 6 is one closest to the vehicle 1 among following vehicles traveling in the lane L3. The preceding vehicle 5 and the following vehicle 6 can be recognized based on the sensor-detected information 53 (specifically, the target information).

The lane changeable condition includes the following three conditions (a) to (c). That is, when all the following three conditions (a) to (c) are satisfied, the autonomous driving control device 30 judges that the lane change to the lane L3 is possible.

(a) An inter-vehicle distance D56 between the preceding vehicle 5 and the following vehicle 6 is equal to or more than a first LC threshold.

(b) An inter-vehicle distance D5 between the vehicle 1 and the preceding vehicle 5 is equal to or more than a second LC threshold (the second LC threshold may be expressed as a function of a relative speed between the vehicle 1 and the preceding vehicle 5).

(c) An inter-vehicle distance D6 between the vehicle 1 and the following vehicle 6 is equal to or more than a third LC threshold (the third LC threshold may be expressed as a function of a relative speed between the vehicle 1 and the following vehicle 6).

As still another example of the increase in the safety margin is to tighten the lane changeable condition. In other words, the autonomous driving control device 30 makes the lane changeable condition in the case of the performance-oriented mode be harder to satisfy as compared with the case of the driver-oriented mode. It is possible to tighten the lane changeable condition by increasing at least one of the first to third LC thresholds described above.

(A9) Increase Inter-Vehicle Distance at Start of Overtaking

Figure 14:
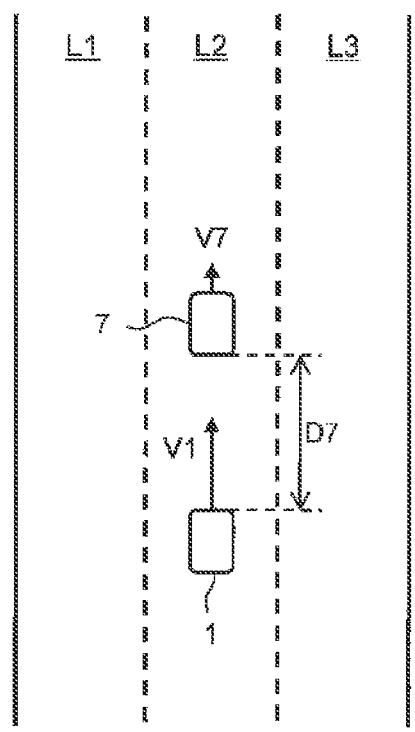
FIG. 14 is a conceptual diagram for explaining an overtaking execution condition in the embodiment of the present disclosure.

FIG. 14 is a conceptual diagram for explaining an overtaking execution condition. A preceding vehicle 7 slower than the vehicle 1 exists ahead of the vehicle 1. The preceding vehicle 7 can be recognized based on the sensor-detected information 53 (specifically, the target information).

The overtaking execution condition includes the following two conditions (d) and (e). That is, when all the following two conditions (d) and (e) are satisfied, the autonomous driving control device 30 starts overtaking processing for overtaking the preceding vehicle 7.

(d) An inter-vehicle distance D7 between the vehicle 1 and the preceding vehicle 7 is less than a first threshold.

(e) A relative speed "V1-V7" between the vehicle 1 and the preceding vehicle 7 is equal to or more than a second threshold.

As still another example of the increase in the safety margin is to increase the inter-vehicle distance D7 at start of the overtaking. It is possible to increase the inter-vehicle distance D7 at start of the overtaking by increasing the above-mentioned first threshold. That is, the autonomous driving control device 30 increases the first threshold in the case of the performance-oriented mode as compared with the case of the driver-oriented mode.

4. Reduction in Time to Arrive at Destination

The standpoint (B) is reduction in a time to arrive at the destination. The autonomous driving control device 30 performs the autonomous driving control with giving priority to reduction in the time to arrive at the destination, regardless of the setting by the driver or the will of the driver.

(B1) Actively Perform Overtaking

For example, it is possible to reduce the time to arrive at the destination by actively performing overtaking. To this end, the autonomous driving control device 30 loosens the above-described overtaking execution condition by decreasing the second threshold in the overtaking execution condition. In other words, the autonomous driving control device 30 decreases the second threshold in the case of the performance-oriented mode as compared with the case of the driver-oriented mode.

(B2) Stay in Fast Lane

Figure 15:
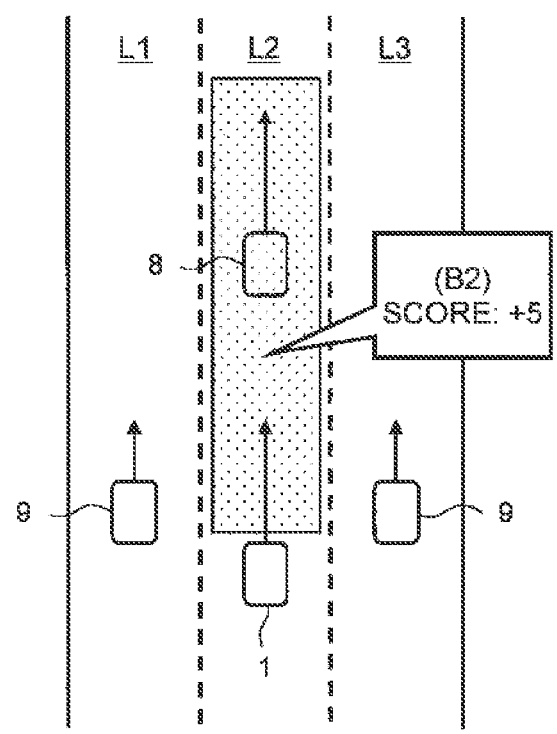
FIG. 15 is a conceptual diagram for explaining a still another example of lane planning by the autonomous driving system according to the embodiment of the present disclosure.

As still another example, it is possible to reduce the time to arrive at the destination by staying in a fast lane. In FIG. 15, the vehicle 1 is traveling in a lane L2. A preceding vehicle 8 exists in the lane L2 ahead. Moreover, other vehicles 9 exist in lanes L1 and L3 adjacent to the lane L2. The preceding vehicle 8 and the other vehicles 9 can be recognized based on the sensor-detected information 53 (specifically, the target information). When a speed of the preceding vehicle 8 is higher than an average speed of the other vehicles 9 by a certain value or more, the autonomous driving control device 30 judges that "a traffic flow in the lane L2 is faster than the other lanes L1 and L3". In this case, the autonomous driving control device 30 increases the score of the lane L2 such that the vehicle 1 stays in the lane L2.

5. Improvement in Fuel Economy

The standpoint (C) is improvement in fuel economy. For example, it is possible to improve the fuel economy by utilizing an eco-drive mode. In the case of the performance-oriented mode, the autonomous driving control device 30 may perform the vehicle travel control in the eco-drive mode, regardless of the setting by the driver or the will of the driver.

6. Improvement in Motion Performance

The standpoint (D) is improvement in motion performance. The autonomous driving control device 30 performs the autonomous driving control with giving priority to improvement in the motion performance rather than the ride quality.

(D1) Increase Upper Limit of Acceleration/Deceleration

For example, the autonomous driving control device 30 increases upper limits of acceleration and deceleration in the case of the performance-oriented mode as compared with the case of the driver-oriented mode. Here, the acceleration and deceleration includes not only acceleration and deceleration in a longitudinal direction but also a lateral acceleration (lateral G). Allowing the acceleration and deceleration to be higher than the case of the driver-oriented mode improves the motion performance of the vehicle 1.

(D2) Improve Following Performance

The autonomous driving control device 30 controls travel of the vehicle 1 so as to follow a target trajectory. Increase in a control gain of the vehicle travel control can increase the following performance, although a feeling of vibration increases and thus the ride quality deteriorates at the same time. That is to say, there is a trade-off relationship between the following performance and the ride quality. The autonomous driving control device 30 increases the control gain in the case of the performance-oriented mode as compared with the case of the driver-oriented mode.

(D3) Shorten Time to Wait for Driver to Complete Situation Check

In a case where the autonomous driving control device 30 makes a lane change, the driver also may desire to check a situation around the vehicle 1. However, the autonomous driving control device 30 and the driver (human) are different in information processing ability, and the autonomous driving control device 30 is able to process more information more quickly as compared with the driver. Therefore, even when the autonomous driving control device 30 judges that a lane change is possible, it is highly probable that the driver does not yet complete judgment.

In view of the above, in the case of the driver-oriented mode, the autonomous driving control device 30 delays a start timing of the lane change for a certain period of time in order to wait for the driver to complete the situation check. In other words, the autonomous driving control device 30 waits for a while after judging that the lane changeable condition (see FIG. 13) is satisfied and then starts the lane change.

On the other hand, in the case of the performance-oriented mode, the autonomous driving control device 30 gives priority to improvement in the motion performance rather than consideration for the driver. Therefore, the autonomous driving control device 30 advances the start timing of the lane change as compared with the case of the driver-oriented mode. As a result, the lane change is performed quickly.

7. Reduction in Frequency of Notification

The standpoint (E) is reduction in a frequency of notification to the driver. The autonomous driving control device 30 notifies the driver of a variety of information through the output device of the HMI unit 150. The higher the frequency of notification becomes, the will of the driver becomes more likely to be reflected in the autonomous driving control. Conversely, the lower the frequency of notification becomes, the will of the driver becomes less likely to be reflected in the autonomous driving control.

(E1) Refrain from Asking Driver for Will

The autonomous driving control device 30 can ask the will of the driver through the HMI unit 150. For example, the autonomous driving control device 30 proposes a predetermined vehicle behavior to the driver. The vehicle behavior to be proposed is exemplified by a lane change, overtaking, keep left driving, and so forth. The driver uses the HMI unit 150 to approve or refuse the proposed vehicle behavior. As another example, the autonomous driving control device 30 presents a plurality of candidates as a travel route to the destination. The driver uses the HMI unit 150 to select a desired travel route from the plurality of candidates.

In the case of the driver-oriented mode, the autonomous driving control device 30 asks the will of the driver. It is thus possible to recognize the will of the driver and reflects the will of the driver in the autonomous driving control. On the other hand, in the case of the performance-oriented mode, the autonomous driving control device 30 performs the autonomous driving control on it's own judgment without asking the will of the driver.

(E2) Reduce Number of Times of Lane Change

As another example, in the lane planning (see FIG. 7), the autonomous driving control device 30 may reduce the number of times of lane change. For example, a "negative score" is added to the sum of scores each time a lane change is incorporated into the travel plan. As a result, the number of times of lane change is suppressed. Since the number of times of lane change is reduced, the autonomous driving control device 30 less frequently makes a proposal of a lane change to the driver. As a result, the will of the driver becomes less likely to be reflected in the autonomous driving control.

What is claimed is:

1. An autonomous driving system mounted on a vehicle comprising:
    a processor programmed to:
    control autonomous driving of the vehicle, wherein modes of the autonomous driving include: (i) a driver-oriented mode in which the autonomous driving control device gives priority to at least one of setting by the driver, will of the driver, and ride quality; and (ii) a performance-oriented mode in which the autonomous driving control device gives priority to at least one of increase in a safety margin, reduction in a time to arrive at a destination, improvement in fuel economy, improvement in motion performance, and reduction in a frequency of notification to the driver;
    calculate an interest level of a driver of the vehicle for the autonomous driving, wherein a low interest state is a state where the interest level is lower than a normal state; and
    control the autonomous driving in the driver-oriented mode when the interest level is calculated to be the normal state; and
    control the autonomous driving in the performance-oriented mode when the interest level is calculated to be the low interest state.

2. The autonomous driving system according to claim 1, wherein
    when increasing the safety margin in the performance-oriented mode, the processor is further programmed to perform keep left driving regardless of the setting by the driver or the will of the driver.

3. The autonomous driving system according to claim 1, wherein
    when a merge lane merges with a merged section of a first lane ahead of the vehicle, and
    when increasing the safety margin in the performance-oriented mode, the processor is further programmed to make the vehicle travel so as to avoid the merged section regardless of the setting by the driver or the will of the driver.

4. The autonomous driving system according to claim 1, wherein
    the processor is further programmed to:
    perform the autonomous driving with a margin distance to a surrounding vehicle, and
    when increasing the safety margin in the performance-oriented mode, increase the margin distance as compared with a case of the driver-oriented mode.

5. The autonomous driving system according to claim 1, wherein the processor is further programmed to:
    when a lane changeable condition is satisfied, judge that a lane change is possible, and
    when increasing the safety margin in the performance-oriented mode, make the lane changeable condition be harder to satisfy as compared with a case of the driver-oriented mode.

6. The autonomous driving system according to claim 1, wherein the processor is further programmed to:
    when an overtaking execution condition is satisfied, start overtaking processing for overtaking a preceding vehicle,
    the overtaking execution condition includes that an inter-vehicle distance between the vehicle and the preceding vehicle is less than a first threshold, and
    when increasing the safety margin in the performance-oriented mode, increase the first threshold as compared with a case of the driver-oriented mode.

7. The autonomous driving system according to claim 1, wherein the processor is further programmed to:
    when an overtaking execution condition is satisfied, start overtaking processing for overtaking a preceding vehicle,
    the overtaking execution condition includes that a relative speed between the vehicle and the preceding vehicle is equal to or more than a second threshold, and
    when reducing the time to arrive at the destination in the performance-oriented mode, decrease the second threshold as compared with a case of the driver-oriented mode.

8. The autonomous driving system according to claim 1, wherein
    when improving the motion performance in the performance-oriented mode, the processor is further programmed to increase upper limits of acceleration and deceleration of the vehicle as compared with a case of the driver-oriented mode.

9. The autonomous driving system according to claim 1, wherein
    when improving the motion performance in the performance-oriented mode, the processor is further programmed to a advance a start timing of a lane change as compared with a case of the driver-oriented mode.

10. The autonomous driving system according to claim 1, wherein
    when reducing the frequency of notification in the performance-oriented mode, the processor is further programmed to perform the autonomous driving without asking the will of the driver.

* * * * *